(12) United States Patent
Watanabe et al.

(10) Patent No.: US 7,286,814 B2
(45) Date of Patent: Oct. 23, 2007

(54) LOCATION REGISTRATION SYSTEM, MOBILE TERMINAL, CONTROL EQUIPMENT, METHODS OF LOCATION REGISTRATION IN THE LOCATION REGISTRATION SYSTEM

(75) Inventors: Yugo Watanabe, Chiyoda-ku (JP); Masumi Fujiwara, Chiyoda-ku (JP); Koji Sasada, Chiyoda-ku (JP); Masami Yabusaki, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 824 days.

(21) Appl. No.: 10/175,893

(22) Filed: Jun. 21, 2002

(65) Prior Publication Data
US 2003/0013444 A1    Jan. 16, 2003

(30) Foreign Application Priority Data
Jul. 10, 2001    (JP)    ............................. 2001-209962

(51) Int. Cl.
H04M 11/04    (2006.01)
(52) U.S. Cl. ................ 455/404.2; 455/433; 455/435.1; 455/456.1; 455/436
(58) Field of Classification Search ............ 455/404.2, 455/433, 435.1, 440, 441, 443, 421, 456, 455/432, 422
See application file for complete search history.

(56) References Cited

U.S. PATENT DOCUMENTS

| | | | | |
|---|---|---|---|---|
| 5,713,073 A | * | 1/1998 | Warsta | ......................... 455/524 |
| 6,249,679 B1 | * | 6/2001 | Guilbaud et al. | ......... 455/456.3 |
| 6,272,344 B1 | * | 8/2001 | Kojima | ..................... 455/435.1 |
| 6,330,446 B1 | * | 12/2001 | Mori | ....................... 455/435.2 |
| 2001/0034232 A1 | * | 10/2001 | Kuwahara | .................. 455/435 |
| 2002/0072369 A1 | * | 6/2002 | Sasada et al. | ............... 455/435 |

FOREIGN PATENT DOCUMENTS

| BR | 9901010-0 | | 1/2000 |
|---|---|---|---|
| JP | 07322333 | | 12/1995 |
| JP | 09-205682 | A | 8/1997 |
| JP | 11-055740 | A | 2/1999 |
| JP | 11298945 | | 10/1999 |

OTHER PUBLICATIONS

Dong-Jun Lee, et al., "On Optimum Timer Value of Area and Timer-Based Location Registration Scheme" IEEE Communications Letters, vol. 5, No. 4, Apr. 2001.

Mouly, M., Pautet, M.: "The GSM System for Mobile Communications", 7.1 Location Management, CELL & SYS, pp. 432-498, 1992-00-00, XP002129579.

* cited by examiner

Primary Examiner—Lester G. Kincaid
Assistant Examiner—Fred Casca
(74) Attorney, Agent, or Firm—Crowell & Moring LLP

(57) ABSTRACT

Mobile terminal status information is sent from a mobile terminal to the communication network after predetermined period advertised from outside, and settings related with a location area for the mobile terminal are made based on the mobile terminal status information at a node in the communication network. In this manner, for example, the optimal location area may be set up in a way to follow changes in the mobile terminal property information, and location control may be performed efficiently even when the mobile terminal does not detect a change of location area, such as when a terminal moving at a high speed slows down it moving speed.

5 Claims, 5 Drawing Sheets

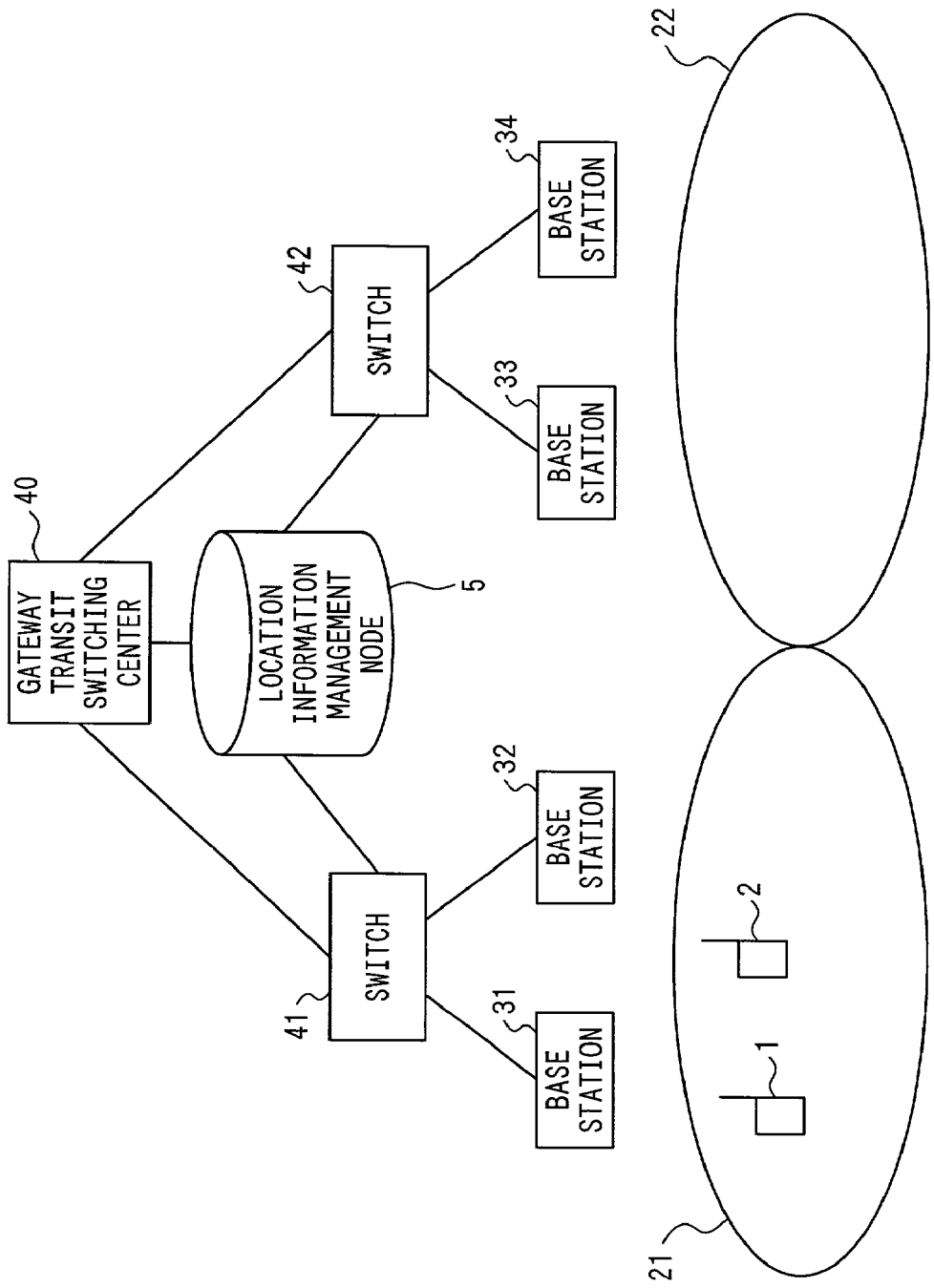

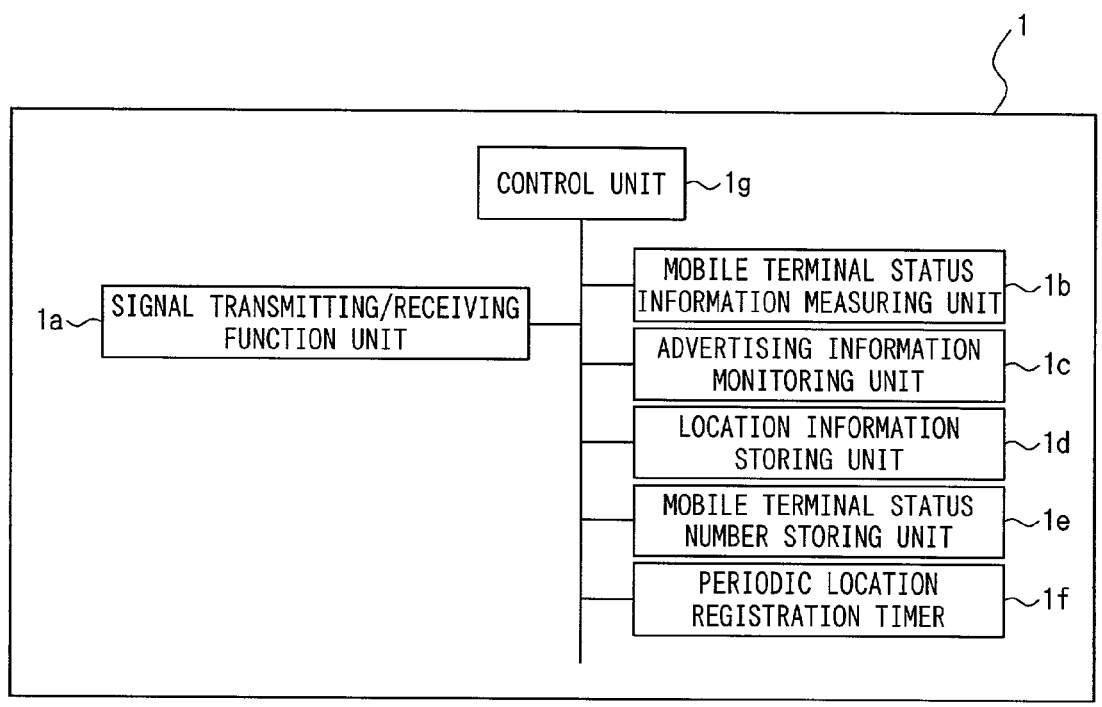

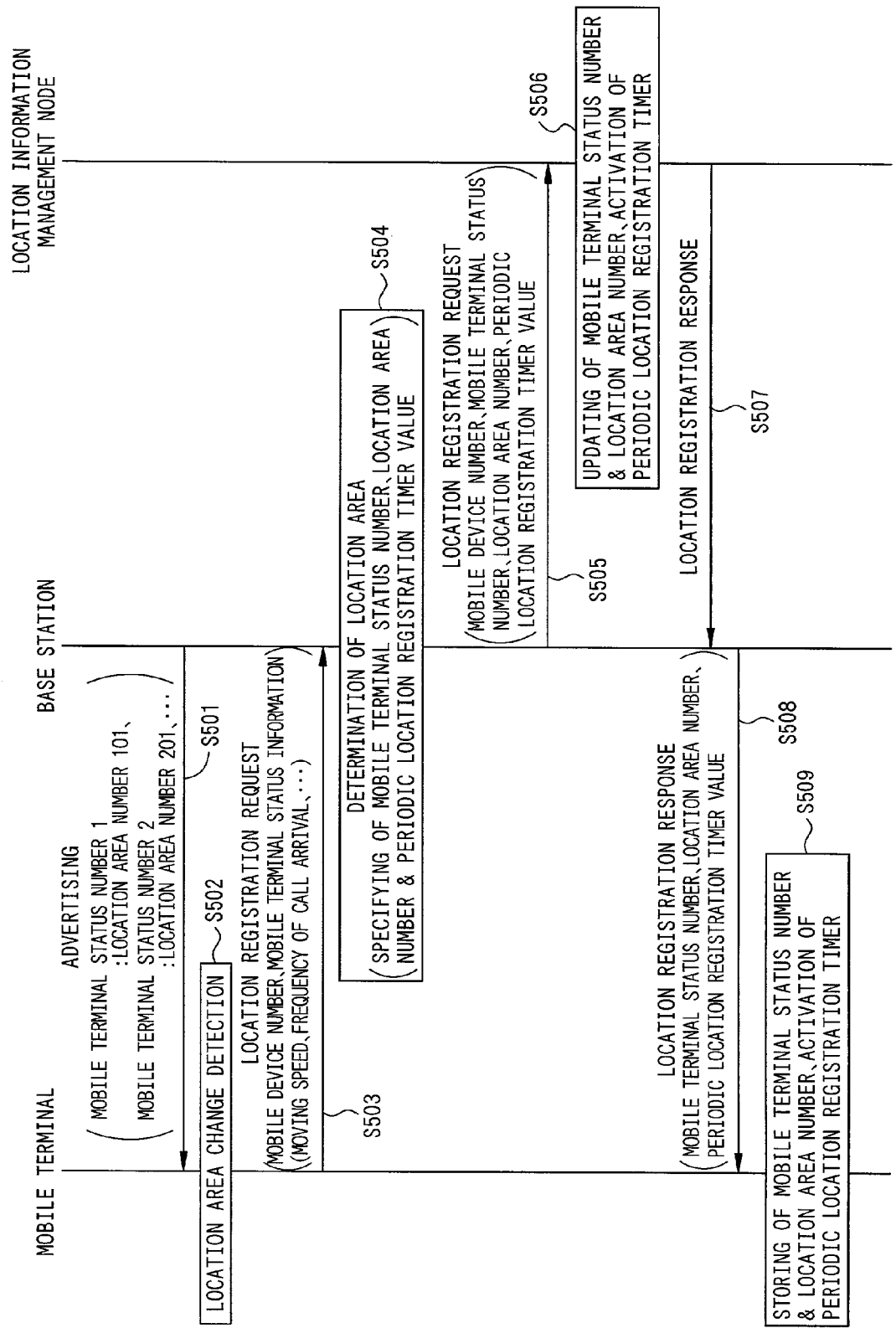

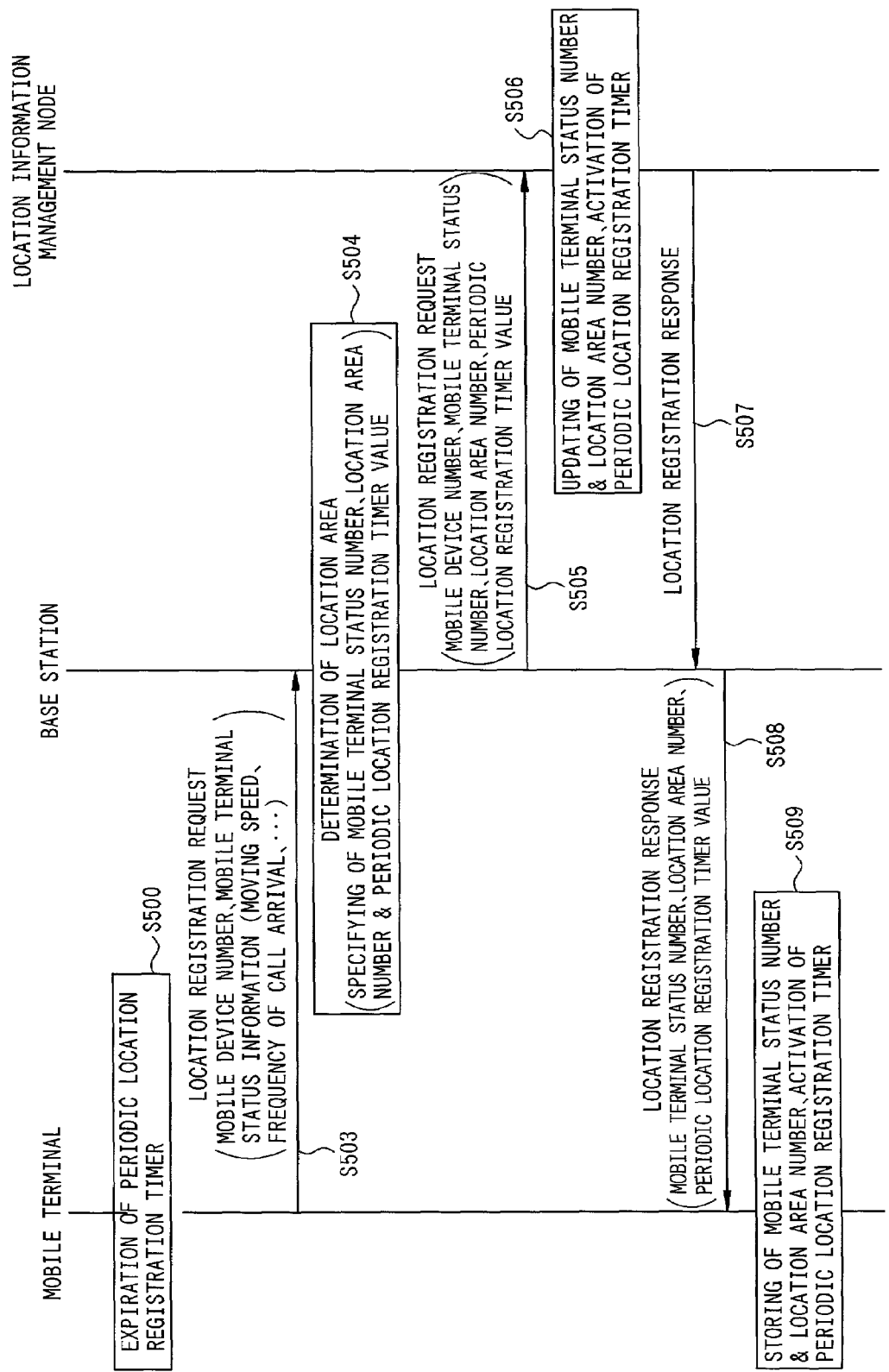

LOCATION REGISTRATION SYSTEM, MOBILE TERMINAL, CONTROL EQUIPMENT, METHODS OF LOCATION REGISTRATION IN THE LOCATION REGISTRATION SYSTEM

BACKGROUND OF THE INVENTION

1. Field of the Invention

The present invention relates to a location registration system, a mobile terminal, a control equipment, and methods of location registration in the location registration system, and particularly to methods of determining a location area (which is also called a location registration area) for a mobile terminal.

2. Description of the Related Art

In a mobile communication system comprising a mobile communication network provided with facilities such as base stations and switches, and mobile terminals accommodated in the mobile communication network, the service areas are formed by a plurality of location areas. In such a mobile communication system, so called location registration process is performed to manage information about the location area to which a mobile terminal belongs. In this location registration process, once a mobile station detects a change in location area, it sends a location registration request signal to the mobile communication network.

In conventional mobile communication networks, the size and shape of the location area are uniformly set for all mobile terminals. However, actually the optimal location area varies for each mobile terminal as it depends on the mobility statuses and traffic properties of each terminal. Consequently, in conventional mobile communication systems, a mobile terminal with a fairly large mobility range relative to the size of location area, when moving at a high speed, location registration request signals are sent frequently. On the other hand, when there is a call arrival for the mobile terminal, paging signals are sent to the mobile terminal by way of all the base stations in the location area in which the mobile terminal is located. That is, within the same location area, the same amount of paging traffic arises for a mobile terminal that is not moving at all (remaining stationary over a long time period) and for a mobile terminal moving frequently within the location area. Thus, conventional location registration systems have experienced unnecessary traffic with respect to location registration and paging.

As a technology for solving these problems, the technology as described in Japanese Unexamined Patent Publication No. Heisei 7-322333 is available. In this publication, a location registration controlling scheme is disclosed in which location registration for a mobile terminal is performed along with determination of a location area for the mobile terminal when the mobile terminal detects the need for changing location areas.

However, in the above described publication, an opportunity for location registration arises only when a mobile terminal crosses a location area boundary or when it is remaining stationary in the same cell over a long time period. That is, in the location registration controlling scheme disclosed in the above described publication, information such as a moving speed and a frequency of call arrival measured at a mobile station is sent to the mobile communication network only when the mobile terminal recognizes a need for changing location areas. Thus, the location registration method in which a location area is determined by the mobile communication network based on values measured at the mobile terminal and the location area is sent to the mobile terminal, has a problem in that a location area cannot be set up when the mobile terminal does not detect a change of location area. For example, when a change of location area does not take place as the mobile terminal is moving frequently, but only within a limited range, a location area will not be set up as the mobile terminal does not perform location registration.

An object of the present invention is to provide a location registration system capable of reducing traffic for location registration and paging in the mobile communication network, as well as a mobile terminal, a control equipment, and a location registration method in such a location registration system.

Another object of the invention is to provide a location registration system capable of setting up the optimal location area even when a change of location area does not take place, as well as a mobile terminal, a control equipment, and a location registration method in such a location registration system.

SUMMARY OF THE INVENTION

The location registration system according to the invention is characterized in that it comprises a mobile terminal that sends mobile terminal status information indicating mobile terminal statuses such as a moving speed and a frequency of call arrival to the communication network after predetermined period advertised from outside, and nodes provided in the communication network to make settings related with a location area for the mobile terminal. The above described mobile terminal may also comprise measuring means for measuring the above described mobile terminal status information.

The predetermined period is advertised from one of the nodes in the communication network. Here, the value of the predetermined period is determined based on the mobile terminal status information.

The mobile terminal comprises a timer for measuring time in accordance with the predetermined period. The nodes provide mobile terminal status numbers for identifying the mobile terminal statuses, manage for each mobile terminal status number a plurality of location areas and a timer value measured by the timer, and advertise the mobile terminal a mobile terminal status number corresponding to a location area determined at the time of location registration for the mobile terminal and the timer value by placing them in a location registration response signal. The nodes may also provide mobile terminal status numbers for identifying the mobile terminal statuses, manage for each mobile terminal status number a plurality of location areas and a timer value measured by the timer, and periodically advertise the mobile terminal the timer value for each mobile terminal status number.

The mobile terminal according to the invention is a mobile terminal in a location registration system that makes settings related with a location area for a mobile terminal at one of the nodes in the communication network. The mobile terminal is characterized in that it comprises sending means for sending mobile terminal status information indicating mobile terminal statuses such as a moving speed and a frequency of call arrival to the communication network after predetermined period advertised from outside, and that setting up a location area for the mobile terminal is made at one of the nodes in the communication network based on the mobile terminal status information. The mobile terminal may also comprise measuring means for measuring the above described mobile terminal status information.

The predetermined period is advertised from one of the nodes in the communication network. The value of the predetermined period is determined based on the mobile terminal status information. The mobile terminal may also comprise a timer for measuring time in accordance with the predetermined period.

The control equipment according to the invention is control equipment provided in a communication network to make settings related with a location area for a mobile terminal. The control equipment is characterized in that it comprises setting means for making settings related with a location area for the mobile terminal based on mobile terminal status information periodically sent from the mobile terminal in a predetermined fashion and indicating mobile terminal statuses such as a moving speed and a frequency of call arrival. The control equipment may also comprise advertising means for advertising the mobile terminal the period for which the mobile terminal is to send the mobile terminal status information.

The predetermined period is determined for each mobile terminal based on the mobile terminal status information.

The above described setting means provides mobile terminal status numbers for identifying the mobile terminal statuses, manages for each mobile terminal status number a plurality of location areas and a timer value of the timer measured at the mobile terminal in accordance with the predetermined period, and advertises the mobile terminal a mobility status number corresponding to a location area determined at the time of location registration for the mobile terminal and the timer value by placing them in a location registration response signal. The setting means may also provide mobility property numbers for identifying the mobility statuses, manages for each mobile terminal status number a plurality of location areas and a timer value of the timer measured at the mobile terminal in accordance with the predetermined period, and periodically advertises the mobile terminal the timer value for each mobile terminal status number.

The location registration method according to the invention is characterized in that it comprises a sending step of sending from the mobile terminal to the communication network mobile terminal status information indicating mobile terminal statuses such as a moving speed and a frequency of call arrival after predetermined period advertised from outside, and a setting step of making settings related with a location area for the mobile terminal based on the mobile terminal status information at nodes provided in the communication network. The method may further comprise a measuring step of measuring the mobile terminal status information so that the mobile terminal status information measured in this measuring step would be sent in the sending step.

The method may further comprise an advertising step of advertising the predetermined period from one of the nodes in the communication network. The value of the predetermined period is determined based on the mobile terminal status information.

In short, mobile terminal status information indicating mobile terminal statuses such as a moving speed and a frequency of call arrival is sent from the mobile terminal to the communication network, and the nodes provided in the communication network make settings related with a location area for the mobile terminal based on the mobile terminal status information. The predetermined period is advertised from one of the nodes in the communication network. The value of the predetermined period is determined based on the mobile terminal status information.

By constructing a location registration system in the above described manner, the optimal location area may be set in a way to follow changes in the mobile terminal status information, and location control may be performed efficiently even when a change of location area does not take place.

BRIEF DESCRIPTION OF THE DRAWINGS

FIG. 1 is a block diagram illustrating an exemplary construction of one embodiment of the mobile communication system according to the invention;

FIG. 2 is a functional block diagram illustrating an exemplary construction of the mobile terminal according to the invention;

FIG. 3 is a diagram illustrating an exemplary construction of a database at a location information management node;

FIG. 5 is a sequence chart for describing the location registration operation at the time of location area change; and FIG. 6 is a sequence chart for describing the location registration operation at the expiration of the periodic location registration timer.

DETAILED DESCRIPTION OF THE PREFERRED EMBODIMENTS

Figure 4:
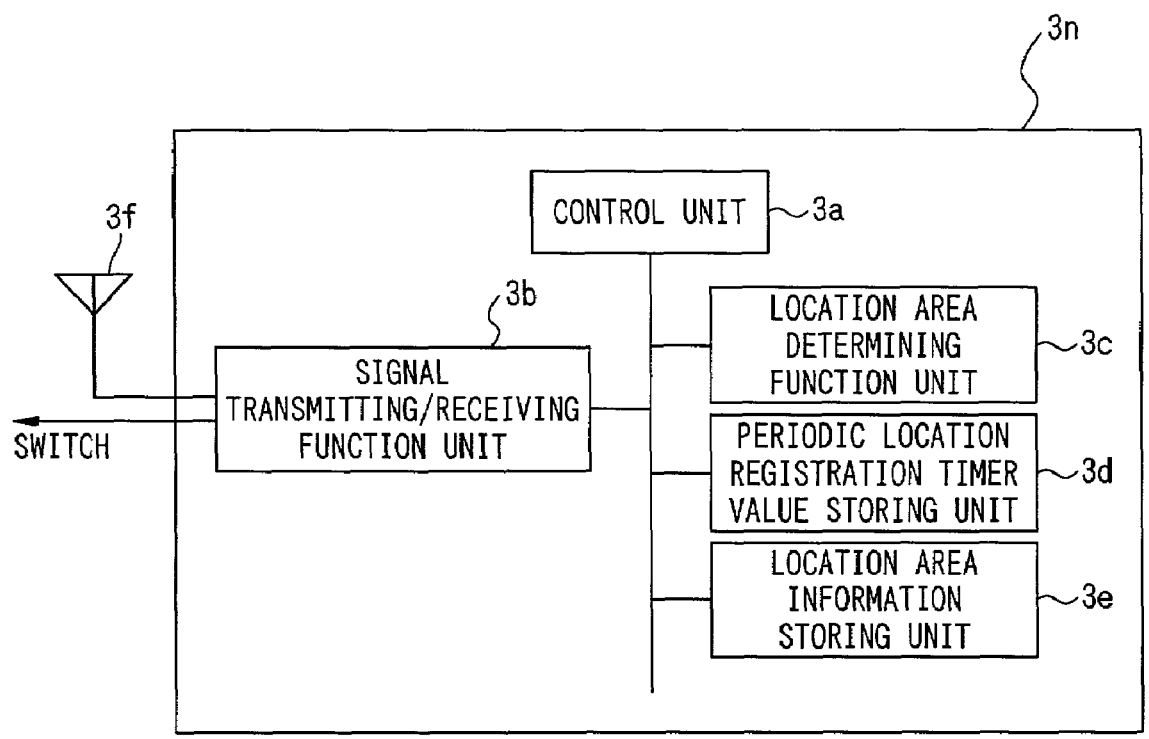
FIG. 4 is a functional block diagram illustrating an exemplary construction of a base station according to the invention.

An embodiment of the present invention will now be described with reference to the drawings. In respective drawings to which reference will be made in the following description, similar parts are indicated by similar numerals throughout the drawings.

(System Construction)

FIG. 1 is a block diagram illustrating one embodiment of the location registration system according to the invention. As shown in FIG. 1, the location registration system according to this embodiment comprises mobile terminals 1, 2 . . . capable of mobile communication, base stations 31, 32, 33, 34 . . . for performing termination of wireless interface between each mobile terminals, location areas 21, 22 . . . for identifying locations of the mobile terminals, subscriber switches (hereafter switches) 41, 42 . . . for accommodating a plurality of base stations, gateway transit switching center 40, . . . for relaying between switches and for connection with other networks, and location information management nodes 5, . . . for maintaining location information of subscribers.

FIG. 2 is a block diagram illustrating an exemplary construction of the mobile terminal 1 in FIG. 1. As shown in FIG. 2, the mobile terminal 1 comprises a signal transmitting/receiving function unit 1a, a mobile terminal status information measuring unit 1b, an advertising information monitoring unit 1c, a location information storing unit id, a mobile terminal status number storing unit 1e, a periodic location registration timer 1f, and a control unit 1g.

The signal transmitting/receiving function unit 1a transmits signals to and receives signals from a base station. The advertising information monitoring unit 1c monitors advertising information periodically advertised from the base station.

The control unit 1g controls operations of respective units of the mobile terminal. The location information storing unit 1d manages the location registration area number to which the terminal belongs. The mobile terminal status number storing unit 1e manages a mobile terminal status number which is advertised from the mobile communication network, and to which the terminal belongs. The periodic location registration timer 1f activates a periodic location registration timer after location registration, and gives a location registration instruction to the control unit 1g at the expiration of the timer. That is, a location registration instruction is given after predetermined period measured by the timer. The mobile terminal status information measuring unit 1b measures and manages the moving speed and the frequency of call arrival on the basis of a constant time unit.

FIG. 3 shows a data configuration managed by the location information management node according to this embodiment. As shown in FIG. 3, the location information management node manages a mobile terminal status number 5b, a location area number 5c, and a periodic location registration timer (remaining time of the timer) 5d for each mobile terminal number 5a. That is, based on the mobile terminal status number as mobile terminal status information, a periodic location registration timer is determined for each mobile terminal.

FIG. 4 is a block diagram illustrating a construction of a base station according to this embodiment. As shown in FIG. 4, the base station 3n (n=1, 2, 3, 4) comprises a transmitting/receiving antenna 3f, a signal transmitting/receiving function unit 3b, a location area determining function unit 3c, a periodic location registration timer value storing unit 3d, a location area information storing unit 3e, and a control unit 3a.

In such a construction, signals are transmitted to and received from the mobile terminal via the transmitting/receiving antenna 3f. The location area information storing unit 3e manages a location area number for each mobile terminal status number. The periodic location registration timer value storing unit 3d manages a periodic location timer value for each mobile terminal status number. The location area determining function unit 3c determines a location area based on the mobile terminal status information (such as a moving speed, a frequency of call arrival, etc.) advertised from the mobile device. In this manner, the base station controls the determination of a location area.

(Operations of the Entire System)

Now, operations of the entire system will be described with reference to FIG. 5. FIG. 5 is a sequence chart describing the operation of the entire system. As shown in FIG. 5, the base station periodically advertises location area numbers corresponding to a plurality of mobile terminal status numbers, and the mobile terminal 1 monitors advertising signals at the advertising information monitoring unit 1c (S501).

Upon receiving advertising information, the mobile terminal 1 compares a location area number corresponding to the mobile terminal status number to which the terminal belongs to the location area number managed at the location information storing unit 1d. By performing this comparison, if the two numbers are different, the mobile terminal can detect the fact that the location area has changed (S502). If the two numbers are different, the mobile terminal sends a location registration request signal to the base station (S503).

The mobile terminal 1 periodically measures a moving speed and a frequency of call arrival (hereafter mobile terminal status information) at the mobile terminal status information measuring unit 1b to retain the information. Then, the mobile terminal 1 sends its mobile device number and mobile terminal status information by adding them to a location registration request signal.

Upon receiving the location registration request signal, the base station 3n determines a location area based on the mobile terminal status information at the location area determining function unit 3c (S504). Here, first, a location property number for configuring a location area is determined at the location area information storing unit 3e. Then, a periodic location registration timer value corresponding to the mobile terminal status number is determined at the periodic location registration timer value storing unit 3d. Then, the base station 3n transmits the location registration request signal to the location information management node 5 (S505) To this location registration request signal, its mobile device number, mobile terminal status information, the location area number and the periodic location registration timer value are attached such that the respective information is advertised by means of this location registration request signal.

Upon receiving the location registration request signal, the location information management node 5 updates the location area number and the mobile terminal status number] mobile terminal status number for the mobile terminal, and activates the periodic location registration timer (S506). Then, the location information management node 5 sends back a location registration response to the base station 3n (S507).

The base station 3n in turn sends back the location registration response signal containing the determined mobile terminal status number, the location area number, and the periodic location registration timer value to the mobile terminal 1 (S508).

Upon receiving this location registration response signal, the mobile terminal 1 stores the mobile terminal status number and the location area number respectively in the mobile terminal status number storing unit 1e and the location information storing unit id, and activates the periodic location registration timer 1f (S509).

In this manner, when the location area numbers do not match, a location registration request is sent to the base station, and settings for a location area are made based on the mobile terminal status information sent from the mobile terminal 1. Otherwise, the period for which the mobile terminal 1 sends mobile terminal status information is advertised from the base station.

Here, in case the periodic location registration timer expires before the mobile terminal 1 detects a change of location area, an operation as described in FIG. 6 will be performed. That is, once the periodic location registration timer expires (S500), the mobile terminal 1 sends a location registration request signal to the base station (S503). Again, to this location registration request signal, as in FIG. 5 described above, the mobile device number and the mobile terminal status information are attached. As the subsequent operations are similar to those already described with reference to FIG. 5, their description will be omitted.

In this manner, when the periodic location registration timer expires, a location registration request is sent to the base station, and settings for a location area are made based on the mobile terminal status information sent from the mobile terminal 1. Here, the period for which the mobile terminal 1 sends mobile terminal status information is advertised from the base station.

(Location Registration Method)

In the location registration system described above, the following location registration method is achieved. Namely, a location registration method comprising a sending step of sending from the mobile terminal to the communication network after predetermined period mobile terminal status information indicating mobile terminal statuses such as a moving speed and a frequency of call arrival, and a setting step of making settings related with a location area for the mobile terminal based on the mobile terminal status information at nodes provided in the communication network is achieved. The method may further comprise a measuring step of measuring the mobile terminal status information so that the mobile terminal status information measured in this measuring step would be sent in the sending step.

The method may further comprise an advertising step of advertising the predetermined period from one of the nodes in the communication network. The value of the predetermined period is determined based on the mobile terminal status information.

By adopting such a location registration method, the optimal location area maybe set up even when a change of location area does not take place.

(Variations)

The above described location registration system is not limited to the above described embodiment, and, for example, the following variations may be adopted.

(1) While in the preceding description, an example is shown where the optimal location area is determined at the base station, it is apparent that the determination for the optimal location area may be performed at other nodes such as switches. That is, the determination may be made at any control equipment provided in the communication network.

(2) Rather than advertising periodic location registration timer value to the mobile terminal by a location registration response as described above, a periodic location registration timer value for each mobile terminal status number may be advertised from any node such as a base station.

(3) Moreover, while a periodic registration timer value is advertised to the location information management node from the base station, the location information management node may manage a periodic location registration timer value for each mobile terminal status number and activates the timer with a periodic location registration timer value determined on the basis of a mobile terminal status number advertised from the base station.

(4) While in the preceding description, a location area is set up in advance for each mobile terminal status number based on mobile terminal status numbers, rather than using mobile terminal status numbers, a plurality of base station numbers may be used to identify location areas, advertising the base station numbers to the mobile station by a location registration response.

(5) Furthermore, in each of the above described variations, a periodic location registration timer value suitable for a location area may be determined by the mobile communication network, advertising the value to the mobile terminal by a location registration response.

It is understood that "advertising" as used herein is a concept that includes "notifying." Here, "advertising" generally refers to sending of information to unspecified terminals, and "notifying" refers to sending of information to specific terminals.

As described above, by sending mobile terminal status information from the mobile terminal to the communication network after predetermined period advertised from outside, and by making settings related with a location area for the mobile terminal based on the mobile terminal status information at a node in the communication network, the present invention provides advantages of allowing the optimal location area to be set up in away to follow changes in mobile terminal property information, and location control to be performed efficiently even when the mobile terminal does not detect a change of location area, such as when a terminal moving at a high speed slows down it moving speed.

What is claimed is:

1. A location registration system, comprising:
    a mobile terminal for sending mobile terminal status information including a moving speed and a frequency of call arrival, to a communication network for a predetermined period, said communication network including additional mobile terminals:
    a base station for terminating a wireless interface between each mobile terminal; and
    a location information management node provided in said communication network for making settings according to a location area for said mobile terminal, based on said mobile terminal status information; wherein,
    said mobile terminal comprises measuring means for measuring said mobile terminal status information and a timer for measuring time in accordance with said predetermined period;
    said predetermined period is advertised from the location information management node in said communication network and determined based on said mobile terminal status information; and
    nodes in said communication network provide mobile terminal status numbers, manage for each mobile terminal status number a plurality of location areas and a timer value measured by said timer, and advertise to said mobile terminal a mobile terminal status number corresponding to a location area determined at the time of location registration for said mobile terminal and said timer value by placing them in a location registration response signal.

2. A location registration system, comprising:
    a mobile terminal for sending mobile terminal status information including a moving speed and a frequency of call arrival, to a communication network after a predetermined period, said communication network including additional mobile terminals;
    a base station for terminating a wireless interface between each mobile terminal; and
    a location information management node provided in said communication network for making settings according to a location area for said mobile terminal, based on said mobile terminal status information; wherein,
    said mobile terminal comprises measuring means for measuring said mobile terminal status information and a timer for measuring time in accordance with said predetermined period;
    said predetermined period is advertised from the location information management node in said communication network and determined based on said mobile terminal status information; and
    nodes in said communication network provide mobile terminal status numbers, manage for each mobile terminal status number a plurality of location areas and a timer value measured by said timer, and periodically advertise to said mobile terminal said timer value for each mobile terminal status number.

3. A control equipment provided in a communication network that includes at least one mobile terminal, said control equipment comprising:
    setting means for making settings according to a location area for said mobile terminal based on mobile terminal status information sent periodically from said mobile terminal in accordance with a predetermined period, including a moving speed and frequency of call arrival; wherein settings for a location area for said mobile terminal are made at a location information management node in said communication network, based on said mobile terminal status information;

said predetermined period is advertised from the location information management node in said communication network, and determined based on said mobile terminal status information; and said setting means provides mobile terminal status numbers for identifying mobile terminal statuses, manages for each mobile terminal status number a plurality of location areas and a timer value of the timer measured at said mobile terminal in accordance with said predetermined period, and advertises to said mobile terminal a mobile terminal status number corresponding to the location area determined at the time of location registration for said mobile terminal and said timer value, by placing them in a location registration response signal.

4. A control equipment provided in a communication network that includes at least one mobile terminal, said control equipment comprising:

setting means for making settings according to a location area for said mobile terminal based on mobile terminal status information sent periodically from said mobile terminal in accordance with a predetermined period, including a moving speed and frequency of call arrival; wherein settings for a location area for said mobile terminal are made at a location information management node in said communication network, based on said mobile terminal status information;

said predetermined period is advertised from the location information management node in said communication network and determined based on said mobile terminal status information; and said setting means provides mobile terminal status numbers for identifying mobile terminal statuses, manages for each mobile terminal status number a plurality of location areas and a timer value of the timer measured at said mobile terminal in accordance with said predetermined period, and periodically advertises to said mobile terminal said timer value for said each mobile terminal status number.

5. A location registration method, comprising:

sending from a mobile terminal to a communication network mobile terminal status information indicating mobile terminal statuses, including a moving speed and a frequency of call arrival, after a predetermined period;

advertising said predetermined period from a node in said communication network;

making settings according to a location area for said mobile terminal based on said mobile terminal status information at nodes in said communication network; and measuring said mobile terminal status information sent in said sending step; wherein settings for a location area for said mobile terminal are made at a location information management node in said communication network based on said mobile terminal status information;

said predetermined period is advertised from the location information management node in said communication network;

the value of said predetermined period is determined based on said terminal status information; and said making settings step includes providing mobile terminal status numbers for identifying said mobile terminal statuses, managing for each mobile terminal status number a plurality of location areas and a timer value of the timer measured at said mobile terminal in accordance with said predetermined period, and periodically advertising to said mobile terminal said timer value for said each mobile terminal status number.

* * * * *